United States Patent [19]

Swearingen

[11] 4,192,329
[45] Mar. 11, 1980

[54] PORTABLE DRESSING TABLE OR VANITY

[76] Inventor: Gloria K. Swearingen, 1805 B Stanford, Columbia, Mo. 65201

[21] Appl. No.: 865,519

[22] Filed: Dec. 29, 1977

[51] Int. Cl.² ........................................... A45D 40/00
[52] U.S. Cl. ...................................... 132/79 R; 248/1
[58] Field of Search ............... 132/79, 83; 248/1, 453, 248/364, 346; 220/69, 1 H; 206/567; 224/28 R; 131/241

[56] References Cited

U.S. PATENT DOCUMENTS

| | | | |
|---|---|---|---|
| 2,122,983 | 7/1938 | Lewis | 132/83 R |
| 2,219,974 | 10/1940 | Bellow | 248/1 |
| 2,293,530 | 8/1942 | Beehler | 132/79 F |
| 2,335,359 | 11/1943 | Rosenberg | 132/83 R |
| 2,576,730 | 11/1951 | Thompson | 132/83 R |
| 2,601,767 | 7/1952 | Wall | 248/1 |
| 3,863,882 | 2/1975 | Hatcher | 248/1 |

Primary Examiner—G. E. McNeill
Attorney, Agent, or Firm—Howard I. Podell

[57] ABSTRACT

A portable dressing table or vanity comprising a deformable base adapted to assume the contour of the user's lap or knee or on a table. Surmounting the base and secured thereto is a holder having a drawer, flanked by lidded boxes. A mirror mounted between the boxes is foldable into a cavity in the top of the holder. The vanity can be used while watching TV or by bedridden persons or while traveling.

4 Claims, 3 Drawing Figures

PORTABLE DRESSING TABLE OR VANITY

FIELD OF THE INVENTION

This invention relates generally to a lap or knee supported vanity or dressing table.

DESCRIPTION OF THE PRIOR ART

The prior art, as exemplified by U.S. Pat. Nos. 3,821,936; 3,933,286; 3,858,592; 2,573,763; and 2,979,990 is generally illustrative of the pertinent art but the aforementioned patents are non-applicable to the present invention. While the prior art expedients are generally acceptable for their intended purposes only, they have not proven entirely satisfactory in that they are either complex and expensive to manufacture, or bulky and inconvenient to use. As a result of the shortcomings of the prior art, typified by the above, there has developed a substantial need for improvement in this field.

The principal object of this invention is to provide a device or article of this character which combines simplicity, strength and durability in a high degree, together with inexpensiveness of construction so as to encourage widespread use thereof.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

SUMMARY OF THE INVENTION

This invention resides in a portable dressing table or vanity comprising a deformable base adapted to assume the contour of the user's lap or knee or on a table. Surmounting the base and secured thereto is a holder having a drawer, flanked by lidded boxes. A mirror mounted between the boxes is foldable into a cavity in the top of the holder. The vanity can be used while watching TV or by bed-ridden persons or while traveling.

BRIEF DESCRIPTION OF THE DRAWING

In the accompanying drawing, in which is shown one of the various possible illustrative embodiments of this invention, wherein like reference character identify the same or like parts.

DESCRIPTION OF THE PREFERRED EMBODIMENT

Figure 1:
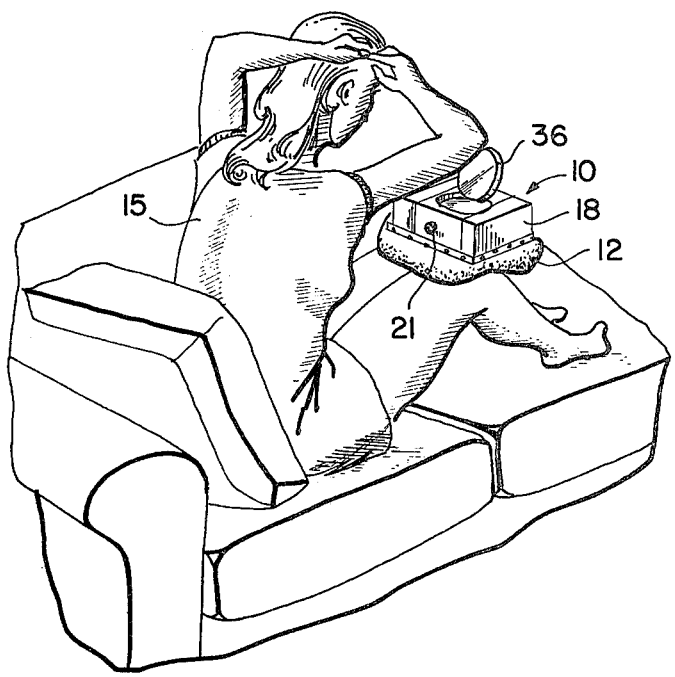
FIG. 1 is a view in perspective showing use of the vanity of the present invention.

With reference to the drawing, there is shown and illustrated a lap supported vanity constructed in accordance with the principles of the invention and designated generally by reference character 10. The illustated tangible embodiment of the invention includes a deformable base 12 consisting of plastic chips 14 of styrofoam or the like mixed with heavier particles such as shot to give it a flexible "bean bag" property whereby it can change in shape to accommodate a user 15 (FIG. 1) as the user changes position. The upper part of base 12 is secured by yarn or rivets 16 to the lower part of a rectangular mirror and small article holder 18.

Holder 18 can be made of papier-mache painted and given protective coats of plastic. Similarly, holder 18 can be molded integrally of suitable molding powders such as "Lexan" polycarbonate resin or the like.

Figure 3:
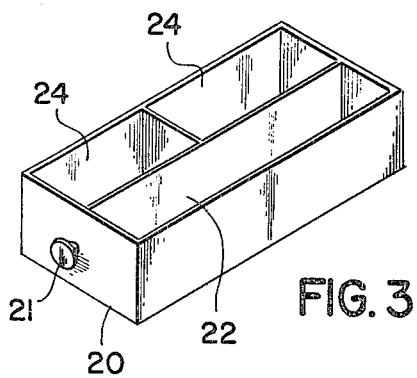
FIG. 3 is a perspective view, partly in section, of the vanity.

Centrally of holder 18 is a drawer 20 slidably mounted therein. As shown in FIG. 3, drawer 20 includes one long compartment 22, knob 21, and two short compartments 24 designed to receive any of various small articles such as hairpins, lipsticks, tweezers, eyebrow pencils, jars of cold cream, bobby pins, barretes, rubber bands or the like.

Figure 2:
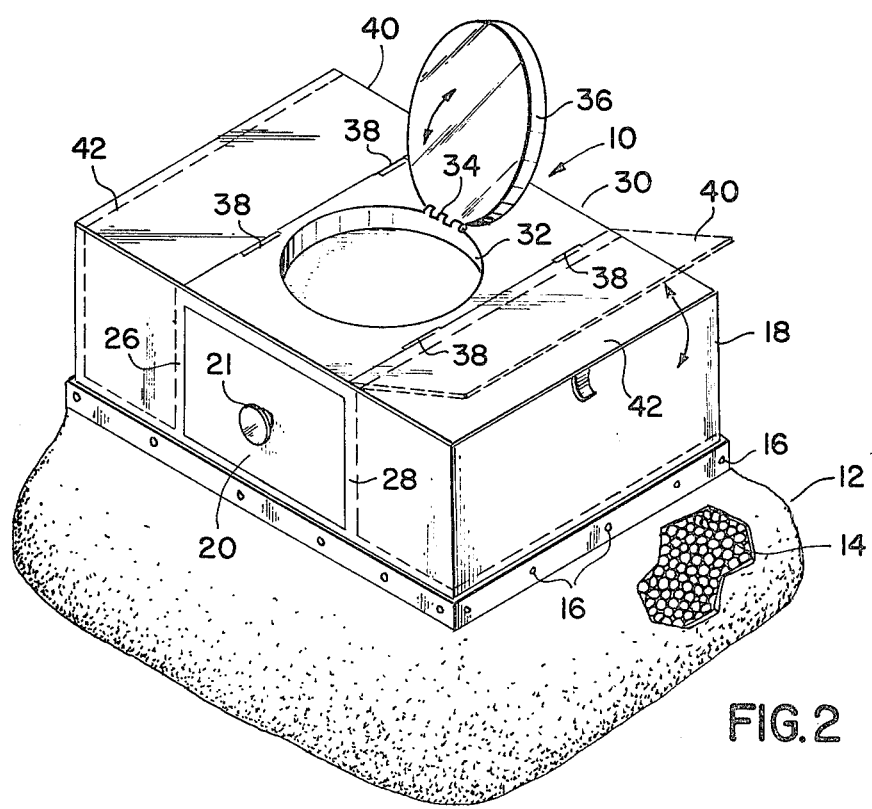
FIG. 2 is a perspective view of the central drawer thereof.

Holder 18, as shown in FIG. 2, includes divider walls 26 and 28, to the upper part of which is secured the center part 29 of top 30. A cavity 32 is formed in center part 29. A hinge 34 foldably secures a four inch mirror 36 to part 29, allowing it to fold into cavity 32 when not in use. Hinged to both sides of part 29 by hinges 38 are lids 40 which close bins 42. Preferably, bins 42 are large enough to contain 24 medium large rollers.

The article of the invention serves as a light-weight, organizational portable dressing table or vanity which can comfortably be used when placed on the lap, the knees or a table. As shown in FIG. 1, with the base rested on the knees of a user, the mirror may be pivoted to a position in which the viewer sees her own reflection. It is particularly useful for persons who set their hair after shampooing and do not have dressing table facilities in their bathrooms, do not have natural light or simply wish to socialize or watch television as they do so.

Preferably, the base of the article is twelve inches long while the holder is about two and one-half inches high.

The operation and use of the invention hereinabove described will be evident to those skilled in the art to which it relates from a consideration of the foregoing.

It will thus be seen that there is provided a device in which the several objects of this invention are achieved, and which is well adapted to meet the conditions of practical use. Its advantages are easily seen.

It is thought that persons skilled in the art to which this invention relates will be able to obtain a clear understanding of the invention after considering the foregoing description in connection with the accompanying drawing. Therefore, a more lengthy description is deemed unnecessary.

It is to be understood that various changes in shape, size and arrangement of the elements of this invention as claimed may be resorted to in the practical development thereof, if desired. The invention, therefore, is not to be restricted except insofar as is necessitated by the prior art.

Having thus described the invention, what is claimed as new and to be secured by Letters Patent is:

1. A portable, organizational dressing table or vanity comprising an inelastic deformable base member, said member being adapted for support on the lap, knees or on a table surface and able to conform to the contour of said surface; a small article holder secured on said base; said holder including a central compartment flanked by storage bins, said compartment having a top provided with a cavity; a mirror hinged adjacent said cavity and adapted to be received therein; a drawer slidable in said compartment; and lids hinged on said top for closing said bins.

2. The invention as recited in claim 1, wherein said base comprises a container at least partly filled with chips of plastic material.

3. The invention as recited in claim 1, wherein said plastic consists of styrofoam.

4. The invention as recited in claim 1 in which the mirror is hinged so as to be pivotable, in a position of use, to a position in which a seated user may view her own reflection when the base is resting on her lap or knees.

* * * * *